ated Oct. 22, 1968

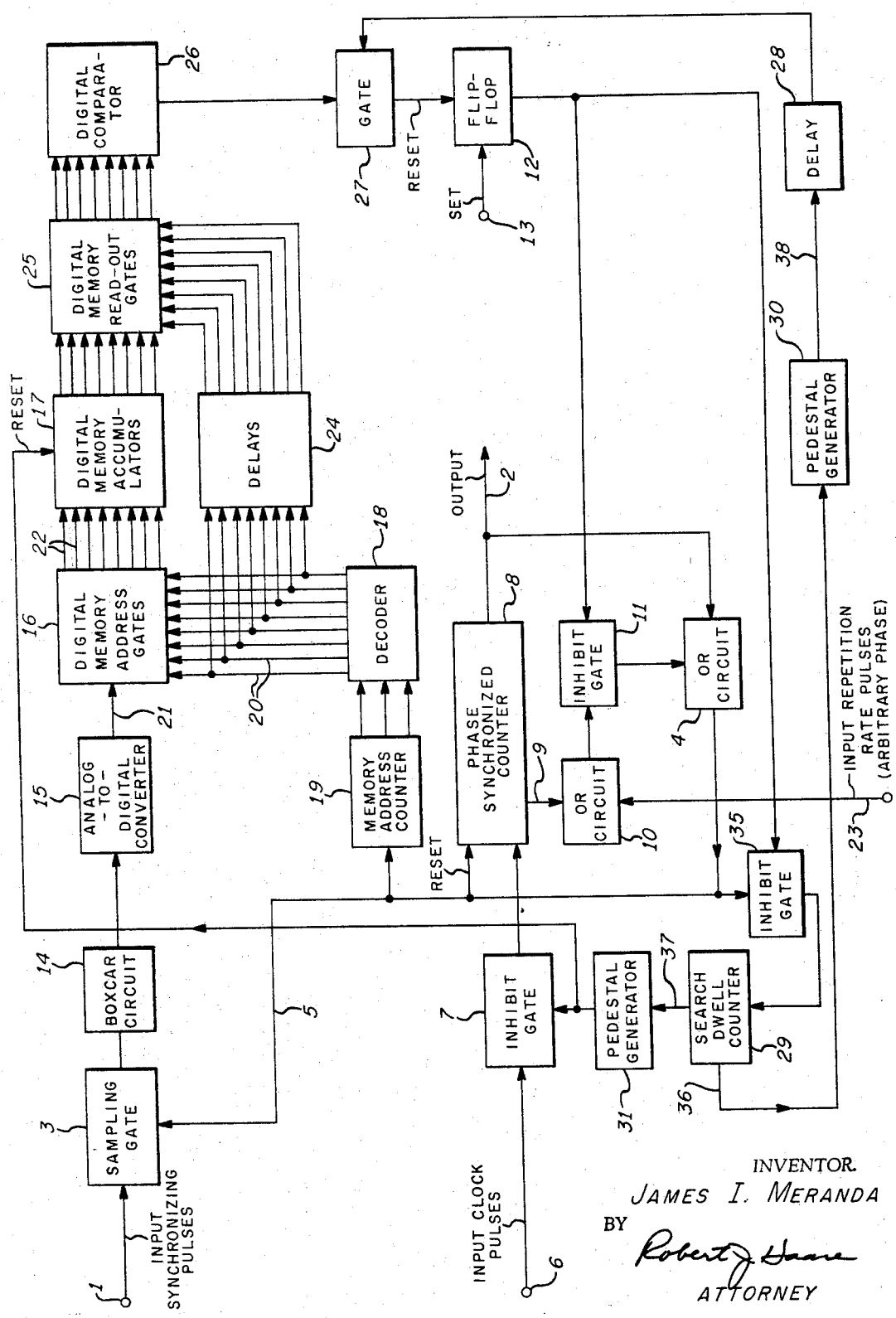

3,407,356
DIGITAL SYNCHRONIZER FOR PULSES OF KNOWN REPETITION INTERVAL BUT UNKNOWN PHASE

James I. Meranda, Flushing, N.Y., assignor to Sperry Rand Corporation, Great Neck, N.Y., a corporation of Delaware Filed July 19, 1965, Ser. No. 472,784
6 Claims. (Cl. 328—55)

ABSTRACT OF THE DISCLOSURE

Pulse synchronizing apparatus including a pulse counter producing first and second trains of output pulses, the repetition rate of the first pulses being equal to the repetition rate of input pulses to be synchronized to and the repetition rate of the second pulses being higher than that of the first pulses. The first and second pulses and third pulses having the same repetition rate but arbitrary phase relative to the input pulses reset the counter and sample the input pulses in a sampling gate whose output is integrated and compared to a predetermined amplitude value. The application of the second and third pulses to the sampling gate is interrupted when the predetermined amplitude value is exceeded. Clock pulses applied to the counter are interrupted momentarily if the amplitude value is not exceeded after a certain interval.

---

The invention herein described was made in the course of or under a contract or subcontract thereunder, with the Department of the Navy.

The present invention relates to systems for phase synchronizing locally generated repetitive pulses to received repetitive pulses where the period of the received pulses is accurately known but not the time phase of the received pulses relative to said locally generated pulses.

There are many instances wherein it is desirable to phase lock signals generated by a local oscillator to signals of the same frequency being received from an independent source. For example, in a loran receiver, pulses derived from a local oscillator are phase synchronized to pulses received from a master station, pulses separately derived from the same local oscillator are phase synchronized to pulses received from a slave station, and the time difference between corresponding phase synchronized pulses is measured in order to determine the time difference between the arrivals of the master and slave pulses. Although the repetition interval of the received master and slave pulses is accurately known so that the frequency of the local pulses can be precisely established, the problem remains of determining the time phases (times of occurrences) of the master and slave pulses within the known repetition interval. The local pulses initially are generated at arbitrary times relative to the arrivals of the master and slave pulses. Therefore, it is necessary to search for the occurrences of the received master and slave pulses within the known repetition interval so that the local pulses may be phase synchronized thereto.

The problem of searching for and detecting the presence of a pulse within a known repetition interval but unknown time phase with respect to said interval is aggravated when the pulse is of short duration relative to the duration of the interval. Some loran pulses, for example, have durations of a few hundred microseconds and a repetition interval of one hundred thousand microseconds. Naturally, it is desirable that the total repetition interval be searched with dispatch so as to minimize the time necessary to find the pulses. On the other hand, the rapidity with which the search is made should not handicap the determination of whether or not a signal is present. Clearly, the presence of a short duration pulse in a long repetition interval cannot be ascertained by an extremely rapid scanning of the entire repetition interval which produces an undetectable amount of signal energy during the brief time that the actual pulse position is being searched through.

One object of the present invention is to provide automatic means for rapidly determining the time phase of a relatively short duration pulse in a known long repetition interval.

Another object is to provide automatic digital means for phase synchronizing local pulses to received pulses of known repetition interval instantaneously with the determination of the time phase of the received pulses within the known repetition interval.

These and other objects of the present invention, as will appear from a reading of the following specification, are accomplished in a preferred digital embodiment by the provision of means including a pulse counter which receives input clock pulses of fixed repetition rate and produces two output pulsed signals of different reduced repetition rates. The repetition rate of the first output signal is precisely equal to the known repetition rate of received synchronizing pulses to which the first output signal is to be phase synchronized. The second output signal is of a higher repetition rate depending upon the number of times that signal samples are to be made during the known repetition interval of the received synchronizing pulses to establish the time of arrival of the synchronizing pulses. The received signals (which include the synchronizing pulses) are sampled at times concurrent with the second output signal from the counter, the counter being reset to zero at each sampling time. The counter is also reset to zero by pulses from a reference signal source having the same repetition interval but arbitrary phase with respect to the received synchronizing pulses. Inasmuch as the counter is reset at the known repetition intervals by the reference pulses, the same group of time positions within each interval are repetitively sampled a predetermined number of times. The several samplings at each of the respective time positions are integrated and a decision is made on the basis of the integrated samplings whether or not a synchronizing pulse is present at any of the respective time positions.

If no synchronizing pulse is present at any of the first group of time positions, a predetermined number of clock pulses are blocked from the counter so as to time shift the occurrences of the second output pulsed signal from the counter relative to their initial times of occurrences at which the first group of signal samplings were made. A second group of signal samplings is made at the new time positions, the samplings made at the same time positions are integrated, and the integrated signals are again sensed to determine the presence of a synchronizing pulse. In the event that no synchronizing pulse is yet detected, the same predetermined number of clock pulses is blocked from the counter and a third group of signal samplings are made and so on. Each subsequent group of signal samplings is time displaced from the preceding group of samplings by an increment less than the known duration of the synchronizing pulses. Eventually, the entire repetition interval of the synchronizing pulses is searched through. Inevitably, one of the signal samplings will be substantially coincident or phase synchronized to one of the synchronizing pulses. Inasmuch as the counter is reset to zero concurrently with each signal sampling, the second output pulsed signal from the counter automatically and instantaneously is synchronized to the synchronizing pulses as soon as one of the synchronizing pulses is found.

Upon finding the synchronizing pulses the counter no longer is reset by the second output pulsed signal from the counter or by the reference pulses but is reset, instead, by the first output pulsed signal from the counter. As previously mentioned, the first output pulsed signal recurs at the known repetition rate of the received pulses. Consequently, the first output pulsed signal from the counter is precisely phase synchronized to the synchronizing pulses. A useful feature of the invention is that the counter is permitted to produce the first output pulsed signal only after proper phase synchronization is established.

For a more complete understanding of the present invention, reference should be had to the following specification and to the sole figure which is a simplified block diagram of a preferred digital embodiment. Input synchronizing pulses of known repetition interval but unknown phase within said interval are applied to input line 1. The purpose of the disclosed embodiment is to provide output pulses on line 2 having the same recurrence rate and time phase as the pulses on line 1. The pulses on line 1 are applied to sampling gate 3. Gate 3 is rendered conductive each time that a pulse is produced on line 2 and applied to gate 3 via OR circuit 4. The pulses on lines 1 and 2 are said to be phase synchronized when they are made to occur at the same time at the respective inputs to gate 3.

Sampling gate 3 is rendered conductive each time that a pulse occurs on line 5. Pulses occur on line 5 either at the times of occurrences of the pulses on line 2 or at other times as will be seen later. Input clock pulses of known repetition rate are applied by input line 6 to normally conductive inhibit gate 7. The clock pulses at the output of gate 7 are applied to phase synchronized counter 8 which produces the ultimately desired synchronized output pulses on line 2. Counter 8 also provides output pulses on line 9 at a higher repetition rate than the pulses on line 2. The relationship between the repetition rate of the pulses on lines 2 and 9 is not of special importance. It is only necessary that the repetition rate of the pulses on line 2 be made precisely equal to the known repetition rate of the input pulses on line 1 and that the pulses on line 9 be made to recur at the rate with which the input pulses on line 1 are desired to be sampled. For example, it may be desired to sample the signals on line 1 at eight successive times during the known repetition interval of the synchronizing pulses. In this case, the repetition rate of the pulses on line 9 will be at least seven times but less than eight times the repetition rate of the pulses on line 2. The seven pulses on line 9 plus one pulse on line 23 per repetition interval will cause a total of eight samplings.

Each of the pulses on line 9 is applied by OR circuit 10 to inhibit gate 11. Gate 11 is rendered conductive by the output of flip-flop 12 when flip-flop 12 is in the "set" condition. Flip-flop 12 is placed into said "set" condition on a signal momentarily applied to line 13 at the time when the apparatus is first energized. The pulses of line 9 passed by conducting gate 11 are applied by OR circuit 4 to line 5, in turn rendering gate 3 conductive. If no input signal is present on the line 1 during the occurence of the pulse on line 5, no output signal is produced by gate 3. The output signals (if any) from gate 3 are applied to a conventional boxcar circuit 14 which holds the amplitude of the signal from gate 3 until a subsequent signal of different amplitude issues from gate 3. The analog signal from circuit 14 representing the amplitude of the signal on line 1 at the time of occurrence of a pulse on line 5 is converted into an equivalent digital signal by analog-to-digital converter 15. The digital signal representing the amplitude of the sampled signal at the output of gate 3 is applied to digital memory address gates 16.

In order to enhance the detection of the synchronizing pulses on line 1 in the presence of noise, it is desired that a given time position within the repetition interval be sampled a repetitive number of times and that the individual samplings be accumulated in a respective accumulator. Accordingly, there is provided in digital memory accumulator 17 a number of digital accumulators equaling the number of time positions which are sampled during each repetition interval of the signals on line 1. It has been assumed that eight time positions are sampled during each repetition interval; consequently, eight accumulators are provided within digital memory accumulator 17. The individual samplings are distributed between the respective accumulators by the action of decoder 18 and memory address counter 19.

Counter 19 assumes a respective one of eight different binary states in response to each of the eight pulses on line 5 occurring during a given repetition interval. Each state of counter 19 is decoded by decoder 18, in turn energizing a corresponding one of the output lines 20. Decoder 18 may be of the conventional design described in FIG. 2–24 of "Design of Transistorized Circuits for Digital Computers" by A. I. Pressman, J. F. Ryder Publisher Inc. 1959, pp. 2–27. The signal on line 21 is routed to a particular one of lines 22 at the output of gate 16 in accordance with the particular one of lines 20 which is energized by decoder 18. In this manner, each of the digital signals representing the amplitude of a respective sampling within the repetition interval is routed to a corresponding one of the accumulators within digital memory accumulator 17. Each of the signals on lines 20 is delayed in delays 24 for a length of time sufficient to permit each of the accumulators 17 to respond to a respective output from gate 16 so that the updated value of the signal stored in a given accumulator may be readout. The delayed signals are applied to digital memory read-out gates 25 whereby each of the digital signals stored in accumulator 17 is readout in turn into digital comparator 26.

As soon as a given number represented by a respective digital signal has been updated by the occurrence of the final sampling within a given repetition interval of the synchronizing pulses of line 1, comparator 26 determines whether the updated number is in excess of a predetermined value. Comparators of this type are discussed in "Arithmetic Operations in Digital Computers" by R. K. Richards, D. Van Nostrand Company, 1955, p. 290. A determination of whether or not the number represented by the digital signal stored in any accumulator is in excess of the predetermined value is made at preselected intervals when gate 27 is rendered conductive by pulses at the output of delay 28. Delay 28 receives pulses from pedestal generator 30 connected to the output 36 of search dwell counter 29. Counter 29 produces an output pulse on line 36 following the occurrence of a given number of pulses on line 5 during the time that inhibit gate 35 is conductive. Gate 35 is rendered conductive by the output of flip-flop 12 in the same manner as gate 11 previously discussed. Counter 29 also produces an output pulse on line 37 following the occurrence of a number of pulses on line 5 larger than said given number. For example, if it is desired that the same time point within a given repetition interval be sampled ten times before a decision is made as to whether a synchronizing pulse is present at the same time, counter 29 would produce an output pulse on line 37 every time that 80 pulses were produced on line 5. It should be noted that in the example under discussion, eight pulses are produced on line 5 for each repetition interval and it is desired that each of the eight pulses sample the same time point a total of ten successive times (during ten successive repetition intervals). Thus, the radix of counter 29 (at output 37) is made equal to the product of the number of samplings per repetition interval and the number of repetition intervals over which samplings at the same time point are to be made, i.e., 8×10=80. Under the same conditions, an output pulse would be produced on line 36 every time that 72 pulses were produced on line 5 (the product of the number of samplings per repetition interval and one less than the number of repetition intervals over which samplings at the same time point are to be made, i.e., 8×9=72). Pedestal generator 30 produces a pulse on line 38 having a duration equal to each of the aforementioned repetition intervals whereby gate 27 is open only during substantially the entire tenth repetition interval for the purpose of determining whether synchronization has been achieved.

It may happen that after eight different time samplings are repeated over ten successive repetition intervals, none of the numbers represented by the digital signals stored in accumulator 17 exceeds the predetermined value established in digital comparator 26. This result is interpreted as indicating that none of the eight sampling pulses per repetition interval is in phase alignment with the synchronizing pulses on line 1. Consequently, it is necessary to change the time phase of the eight sampling pulses so that new time points may be sampled. This is accomplished with the aid of pedestal generator 31 which produces an output pulse of predetermined duration each time that a pulse is produced by counter 29 on line 37. The duration of the pulse from generator 31 is made equal to a number of input clock pulses on line 6 corresponding to the time interval with which the new eight sampling pulses are to be displaced with respect to the prior eight sampling pulses. The displacement of the new sampling pulses results from the blocking of inhibit gate 7 by the pedestal output of generator 31. Following the blocking of gate 7, ten successive repetition intervals are sampled at eight new time points and the presence of a signal is determined, as before, by activating gate 27 by the pedestal pulse of line 38 which is delayed in delay 28 for a length of time sufficient to allow the completion of the updating of the digital signal in the first accumulator in digital memory 17 at the beginning of the tenth repetition interval utilizing the new eight sampling pulses. The pulses at the output of generator 31 also are used to reset all of the accumulators 17 to zero value in preparation for the next upcoming samplings.

A source (not shown) of reference pulses having the same repetition rate but arbitrary phase with respect to the signals on line 1 is applied to line 23. The pulses of line 23 are directed by OR circuit 10, gate 11 (when conducting) and OR circuit 4 to line 5. Counter 8 is reset to zero upon the occurrence of each pulse on line 5. Gates 11 and 35 are rendered conductive during the entire searching time interval required to produce pulses on line 2 phase synchronized to the pulses on line 1. When such synchronization is achieved, gates 11 and 35 are inhibited by a change in the state of flip-flop 12.

Ultimately, one of the sampling pulses on line 5 will be time coincident with a synchronizing pulse on line 1 at the respective inputs to sampling gate 3. Counter 8 is reset to zero upon the occurrence of said sampling pulse as upon the occurrences of all the sampling pulses whether or not they are in phase synchronization with the synchronizing pulses on line 1. During the interval between the occurrence of the particular sampling pulse which is in phase synchronization and before the next sampling pulse would occur on line 5, inhibit gates 11 and 35 are blocked by a change in state of flip-flop 12. The blocking of gate 11 permits counter 8 to proceed for the first time to its maximum count whereby pulses are produced on line 2. The first pulse (and all subsequent pulses) on line 2 automatically are synchronized to a synchronizing pulse because the counter was last reset to zero upon the occurrence of the preceding synchronizing pulse and because the time required for counter 8 to produce an output pulse on line 2 starting from zero count is equal to the known repetition interval of the synchronizing pulses on line 1. The blocking of gate 35 terminates the operation of counter 29 and prevents the blocking of gate 7 so that counter 8 continues to produce properly synchronized pulses on line 2.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Apparatus comprising
   a first source of input pulses of known repetition rate but unknown time phase, a second source of pulses to be counted,
   pulse counting means connected to said second source for producing first and second trains of output pulses, the repetition rate of said first pulse train being equal to said repetition rate of said input pulses, the repetition rate of said second pulse train being higher than said repetition rate of said first pulse train,
   a source of a third train of pulses having the same repetition rate as said input pulses,
   means for sampling said input pulses,
   said first pulse train being applied to said sampling means,
   switching means for applying said second and third pulse trains to said sampling means when said switching means is actuated,
   means for resetting said counting means upon the occurrence of any pulse of said first, second and third pulse trains at said sampling means,
   means coupled to the output of said sampling means for producing a control signal upon the concurrence of an input pulse and any pulse of said first, second or third pulse trains at said sampling means, and
   means for deactuating said switching means in response to said control signal.

2. Apparatus as defined in claim 1 wherein said means coupled to the output of said sampling means includes means for integrating the output signals produced by said sampling means.

3. Apparatus comprising
   a source of clock pulses to be counted,
   pulse counting means responsive to said clock pulses for producing first and second trains of pulses of different repetition rate, the repetition rate of said first pulse train being equal to the known repetition rate of an input signal, the repetition rate of said second pulse train being higher than said repetitoin rate of said first pulse train,
   a source of a third train of pulses having the same repetition rate as said input signal,
   means for sampling said input signal,
   said first pulse train being applied to said sampling means,
   switching means for applying said second and third pulse trains to said sampling means when said switching means is actuated,
   means for resetting said counting means upon the occurrence of any pulse of said first, second or third pulse trains at said sampling means,
   means coupled to the output of said sampling means for producing a control signal upon the concurrence of an input signal and any pulse of said first, second and third pulse trains at said sampling means, and
   means for deactuating said switching means in response to said control signal.

4. Apparatus comprising
   a source of clock pulses to be counted,
   pulse counting means responsive to said clock pulses for producing first and second trains of pulses of different repetition rate, the repetition rate of said first pulse train being equal to the known repetition rate of an input signal, the repetition rate of said second pulse train being higher than said repetition rate of said first pulse train,
   a source of a third train of pulses having the same repetition rate as said input signal,
   means for sampling said input signal,
   said first pulse train being applied to said sampling means,
   switching means for applying said second and third pulse trains to said sampling means when said switching means is actuated, means for resetting said counting means upon the occurrence of any pulse of said first, second or third pulse trains at said sampling means, means coupled to the output of said sampling means for producing a control signal upon the concurrence of an input signal and any pulse of said first, second and third pulse trains at said sampling means, means for deactuating said switching means in response to said control signal, gating means for applying said clock pulses to said counting means, and means for temporarily rendering said gating means inoperative upon the occurrence of a predetermined number of pulses of said second and third pulse trains.

5. Apparatus as defined in claim 4 wherein said means coupled to the output of said sampling means includes means for integrating the output signals produced by said sampling means.

6. Apparatus as defined in claim 4 and further including means responsive to said control signal for deactuating said means for temporarily rendering said gating means inoperative.

No reference cited.

ARTHUR GAUSS, *Primary Examiner.*

J. ZAZWORSKY, *Assistant Examiner.*